(12) United States Patent
Ahouanto et al.

(10) Patent No.: US 10,562,348 B2
(45) Date of Patent: Feb. 18, 2020

(54) RUNNING ASSEMBLY (71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Michel Ahouanto, Clermont-Ferrand (FR); Jose Merino Lopez, Clermon-Ferrand (FR); Jacky Pineau, Clermont-Ferrand (FR); Arthur Topin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 691 days.

(21) Appl. No.: 15/103,693

(22) PCT Filed: Dec. 10, 2014

(86) PCT No.: PCT/EP2014/077179
§ 371 (c)(1),
(2) Date: Jun. 10, 2016

(87) PCT Pub. No.: WO2015/086662
PCT Pub. Date: Jun. 18, 2015

(65) Prior Publication Data
US 2016/0311255 A1    Oct. 27, 2016

(30) Foreign Application Priority Data
Dec. 11, 2013    (FR) .................................... 13 62382

(51) Int. Cl.
*B60B 25/18* (2006.01)
*B60C 15/02* (2006.01)
*B60C 5/16* (2006.01)

(52) U.S. Cl.
CPC ............... *B60B 25/18* (2013.01); *B60C 5/16* (2013.01); *B60C 15/02* (2013.01);
(Continued)

(58) Field of Classification Search
CPC ....... B60B 25/18; B60B 25/02; B60B 25/004; B60B 25/006; B60B 25/06; B60C 5/16;
(Continued)

(56) References Cited

U.S. PATENT DOCUMENTS 2,614,603 A * 10/1952 Howley ................. B60B 25/04
152/404
3,486,547 A   12/1969 Powers
(Continued)

FOREIGN PATENT DOCUMENTS

FR    1 267 264    7/1961
FR    2 491 836    4/1982
(Continued)

OTHER PUBLICATIONS

Office Action dated Jan. 25, 2017 which issued in the corresponding Chinese Patent Application No. 201480066941.3.

*Primary Examiner* — Scott A Browne
(74) *Attorney, Agent, or Firm* — Cozen O'Connor (57) ABSTRACT

A running set comprising: a tire (10) comprising two beads (20); a mounting rim (500) of which the width is greater than or equal to 55% and less than or equal to 80% of the maximum axial width of the tire inflated to its service pressure; and at least one adapter (100) which provides the connection between the mounting rim and a bead of the tire.

16 Claims, 4 Drawing Sheets (52) U.S. Cl.
CPC ...... *B60C 15/0203* (2013.01); *B60C 15/0213* (2013.01); *B60C 15/0223* (2013.01)

(58) Field of Classification Search
CPC ....... B60C 5/0213; B60C 5/02; B60C 5/0223; B60C 5/0203; B60C 15/0203; B60C 15/0213; B60C 15/0223; B60C 15/02
See application file for complete search history.

(56) References Cited

U.S. PATENT DOCUMENTS

| | | | | |
|---|---|---|---|---|
| 4,373,567 | A * | 2/1983 | Declercq | B60B 21/10 |
| | | | | 152/379.3 |
| 4,850,411 | A * | 7/1989 | Seitz | B60B 21/021 |
| | | | | 152/379.3 |
| 5,232,032 | A * | 8/1993 | Diernaz | B60C 15/024 |
| | | | | 152/379.4 |
| 5,232,034 | A * | 8/1993 | Gergele | B60C 5/16 |
| | | | | 152/379.4 |
| 6,491,077 | B1 * | 12/2002 | Lopez | B60C 3/00 |
| | | | | 152/454 |
| 6,626,217 | B2 * | 9/2003 | Bestgen | B60B 25/18 |
| | | | | 152/379.4 |
| 2002/0088520 | A1 | 7/2002 | Bestgen | |

FOREIGN PATENT DOCUMENTS

| | | |
|---|---|---|
| JP | 2010-001006 | 1/2010 |
| WO | WO 92/01576 | 2/1992 |

* cited by examiner

RUNNING ASSEMBLY

RELATED APPLICATIONS

This is a U.S. National Phase Application under 35 USC 371 of International Application PCT/EP2014/077179 filed on Dec. 10, 2014.

This application claims the priority of French application no. 1362382 filed Dec. 11, 2013, the entire content of which is hereby incorporated by reference.

FIELD OF THE INVENTION

The present invention relates to a running set made up mainly of a tire, of a rim and of an adapter between the rim and the tire.

BACKGROUND

A tire currently used these days mainly comprises a tread intended to provide contact with the ground, this tread generally being reinforced by a crown reinforcement which is positioned radially on the inside of the tread. The crown reinforcement is able to give the crown the rigidities, in the three dimensions, that it needs for the running of the tire. The crown reinforcement also limits the radial expansion of a carcass reinforcement, generally made up of one or more plies of radial reinforcing elements. When the tire is mounted so as to become functional, it contains an inflation gas, inflated to a nominal pressure. The carcass reinforcement, during the use of the tire within reasonable limits, deforms both statically and when running. The carcass reinforcement is generally anchored in each bead to a reinforcing ring. The beads provide contact with the seat and flange of the rim on which the tire is mounted.

Transmission of mechanical load between the tire and the rim, which load is the result of the inflation, compression and running of the tire, and sealing of this tire are provided by the distribution and the magnitude of the forces of contact between the bead and the rim seats and rim flanges. Good tire behaviour both from the standpoint of endurance and from the standpoint of the properties conferred on the vehicle equipped with it, and a good mounting rim quality/price ratio have led to the adoption of a ratio of rim width to maximum axial tire width of around 0.7. It is known that this ratio is merely a compromise and that a certain number of tire properties, for example roadholding are improved by the use of a rim allowing a higher ratio; conversely, other properties can be improved, of course at the expense of the former properties, by mounting on a narrow rim, namely by having a ratio, as defined hereinabove, of around 0.40 or less.

Patent FR 1 267 264, which seeks to give a tire the mutually contradictory properties of comfort, roadholding, low rolling resistance and high resistance to wear, teaches the outlines a solution that entails giving the carcass reinforcement a structure that is effectively capable of opposing transverse flexibility without detracting from radial structural flexibility. This structure is obtained by superimposing, in the carcass reinforcement, with the initial structure of radial reinforcing elements, a secondary structure of inextensible circumferential reinforcing elements. This secondary structure may moreover modify the shape of the sidewalls of the tire, which shape is dictated by the equilibrium meridian profile of the mid-axis of the carcass reinforcement: circumferential and inextensible reinforcing elements of a diameter substantially equal to or less than the diameter of the rim flange, and arranged radially and axially on the inside of the radial elements of the carcass reinforcement allow this reinforcement to have a meridian profile which is almost horizontally tangential to the annular anchoring element of the carcass reinforcement.

This principle is adopted again in U.S. Pat. No. 3,486,547, and more particularly in an application to a mounting rim width that is markedly smaller than the width of the tread, the ratio of rim width to minimum axial width of tire being 0.41 in the example given.

Although it has attractive properties, this tire is not without its disadvantages, in terms of the ability to steer the vehicle fitted with it. Indeed, the reinforcing reinforcer intended to stabilize the secondary structure has, in the circumferential direction, a very high extension rigidity and a markedly lower compression rigidity. The difference in the moduli of the reinforcing reinforcer according to whether it is being worked in extension or in compression in the radial direction means that the outer lower part experiences significant ovalization when such a tire is subject to a vertical loading. When transverse loading is applied to such an axially loaded tire, the tire exhibits a non-linear response depending on whether the load applied was or was not sufficient to re-tension the part that became compressed during the ovalization.

In order to overcome these disadvantages, U.S. Pat. No. 6,626,217 proposes to dissociate in the above tire the part that can be considered as actually working like a tire from the part that can be considered as acting like a rim. The corresponding running set is made up of a tire, of a narrow rim of which the width is at most equal to 50% of the maximum axial width of the tire inflated to its service pressure, and of two adapters providing the connection between the mounting rim and the beads of the tire, the adapters being made of rubber compositions that are reinforced and elastically deformable at least in the two, radial and axial, directions.

While this running set allows a marked improvement in comfort and resistance to kerbing of the vehicle fitted with it, it is not entirely satisfactory as far as the steering of the vehicle is concerned.

Application WO 92/01576 describes a tire assembly comprising a tire mounted on a rim. A removable protector made of a reinforced rubber circular annulus is inserted between the bead of the tire and the rim. This protector is intended to protect the beads of the tire from the phenomenon of heating during running.

Application FR 2,491,836 describes an adapter positioned between the rim and each bead of a tire and intended to make tire fitting/removal easier.

SUMMARY OF THE INVENTION

One of the objects of the present invention is to define a running set that has good ability to steer while at the same time being resistant to kerbing.

This objective has been achieved, surprisingly, by acting counter to the teachings of U.S. Pat. No. 6,626,217 whereby the rim needs to be narrow.

More specifically, this object is achieved by a running set comprising
  a tire comprising two beads;
  a mounting rim of which the width is greater than or equal to 55% and less than or equal to 80% of the maximum axial width of the tire inflated to its service pressure; and at least one adapter which provides the connection between the mounting rim and a bead of the tire,
the adapter comprising:
an adapter bead via which the adapter catches on the mounting rim;
a housing intended to accept the bead of the tire, the housing comprising a housing reinforcement; and
a connecting body connecting the adapter bead and the housing, the connecting body comprising a main reinforcing reinforcer.

For preference, the running set comprises two adapters which provide the connection between the mounting rim and the two beads of the tire, but could equally just have one single adapter.

Each adapter is preferably "elastically deformable in the two, radial and axial, directions", in so far as in the radial direction it allows travel between the bead of the tire and the mounting rim representing at least 5% of the deflection of the compressed tire under the recommended load and pressure, and in the axial direction allows the bead to move closer to the mounting rim by a value at least equal to 15 mm at zero pressure, these deformations disappearing if the stresses or forces that cause them are removed. Note that the radial deformation needs to be able to occur when the tire is being used inflated to its nominal pressure, whereas the axial deformation is not desirable in normal operation of the tire inflated to its nominal pressure.

In the adapter according to an embodiment of the invention, the adapter bead may also be referred to as "axially inner end". The adapter bead is intended to catch the adapter on the top of the rim flange of a rim, all of this being done conventionally by the bead of a tire. The housing of the adapter intended to accept the bead of the tire and comprising a housing reinforcement may also be referred to as the "axially outer end". This housing accepts the bead of the tire in exactly the same way as the top of a rim flange of a rim conventionally does.

The mounting rim may be of different kinds: it may notably have a mounting well facing towards the inside of the set, the mounting well being extended axially on the outside by frustoconically tapered or flat seats, the frustoconically tapered seats being themselves extended axially on the outside and radially towards the inside by rim flanges with bent over edges, the rim accepting the beads of the adapter via the inside.

The rim is preferably made of a material selected from steel or alloys of aluminium and/or magnesium, composite materials based on carbon fibre, glass fibre, aramid fibre, plant fibre, the said fibres being contained within a matrix based on thermosetting or thermoplastic compounds, or from a complex composite comprising an elastomer and a complex based on resin and fibres selected from carbon fibres, glass fibres, aramid fibres, plant fibres or any combinations of materials.

For preference, the fibre-based composite materials comprise fibres with a length greater than or equal to 5 mm.

The matrix based on thermosetting compounds is selected from epoxy resins, vinylester, unsaturated polyesters, ester cyanate, bismaleimide, acrylic resins, phenolic resins, polyurethanes and combinations thereof.

The matrix based on thermoplastic compounds is selected from polypropylene (PP), polyethylene (PE), polyamides (PA), semiaromatic polyamides, polyester (PET), polybutylene terephthalate (PBT), polyetheretherketone (PEEK), polyetherketoneketone (PEKK), polyethersulphone (PSU), polyetherimide (PEI), polyimide (PI), polyamidelmide (PAI), polyphenylenesulphide (PPS), polyoxymethylene (POM), polyphenylene oxide (PPO).

The presence of a mounting well may prove not to be indispensible; the two seats can then be extended axially and radially towards the inside by two radial discs joined by bolts. The two seats may also be extended axially inwards by two flat parts, themselves extended axially radially by two radial annular discs, which are axially spaced apart and allowing the attachment of a bead clamping plate that may supplement the rim and may potentially serve to support the tread if the tire is running at low or even zero pressure, the plate being made up circumferentially of several independent parts.

The mounting rim may also be of the flanged rim type with the rims directed radially inwards, as described and shown in Patent FR 2 610 872, the beads of the tire becoming lodged on the rim seats on the inside.

Likewise, the mounting rim may comprise a flat rim bottom, the rim bottom being, on one axial side of the rim, extended by a conically tapered seat which is itself extended by a rim flange or hoop, the conically tapered seat and the rim flange being fixed on its axial side, the rim bottom being, on the axially opposite side, supplemented firstly by a mobile part that is made up of a flange and of a conically tapered ring and can be slipped over the rim bottom, and secondly by a locking ring for immobilizing the mobile part on the rim bottom, an O ring sealing the assembly.

The housing reinforcement may notably be produced in the form of a metal (for example steel) element, of which a first part is produced in such a way as to form a seat for the tire, this first part potentially being able to be extended axially on the outside by a second part acting as a "rim flange". This flange may have a small height and a usual shape, particularly bent over at its end. The housing reinforcement is preferably coated in a rubber compound. However, it is also possible to produce the housing reinforcer from a nylon, PET or aramid material, or even from a (epoxy) resin matrix provided with reinforcing fibres made of rayon, aramid, PET, nylon, glass fibre, carbon fibre or basalt fibre, PEN or PVA.

The main reinforcing reinforcer may be produced from one of the materials known to those skilled in the art for the making of tire carcass reinforcements and having a modulus higher than 4 GPa. What is meant here by "modulus" is the extension modulus, as taken from a force-elongation curve, obtained in a way well known to those skilled in the art using an "INSTRON" tensile test machine (see also standard ASTM D 885-06). Test specimens are tensile tested on an initial length L0 (in mm) at a nominal rate of L0 mm/min, under a standard preload of 0.5 cN/tex (averaged over at least 10 measurements). The elongation modulus at 2% is then determined from the force-elongation curve. It is notably possible to use metal (for example steel) cords or textile cords (made of rayon, aramid, polyethylene, nylon, glass fibre, carbon fibre or basalt fibre, PEN or PVA). In the case of metal reinforcing elements, the elongation modulus is determined in accordance with standard ISO 6892.

The connecting body allows deformation at least in the two, radial and axial, directions, and creates the actual connection between the adapter bead and the housing with its housing reinforcement. The make-up of the adapter bead is dependent on the mounting rim catching system, but mainly comprises a circumferential anchoring ring which may be a simple ring of rubber compound which may or may not be reinforced, a bead wire or a stack of reinforcing elements oriented circumferentially. The reinforcing reinforcer of the adapter is anchored around this anchoring rim with a turn-up or is anchored between the reinforcing elements of the ring using clamping. The reinforcer may be formed of the same constituent parts that are used in a known tire carcass reinforcement, i.e. formed of one or more plies of reinforcing elements that are radial or crossed from one ply to the next making a given angle with the circumferential direction of the tire. These reinforcing elements may be textile and/or metal and/or plastic, in the form of monofilaments and/or cords and/or of strips.

The list of elastomers that can be used to make the circumferential anchoring ring includes, firstly, rubbers that can be crosslinked by chemical vulcanization reactions by sulphur bridges, by carbon-carbon bonds created by the action of peroxides or of ionizing radiation, by other specific atom chains of the elastomer module, secondly, thermoplastic elastomers (TPEs) in which the elastically deformable part forms a network between rather non-deformable "hard" regions, the cohesion of which is the product of physical connections (crystallites or amorphous regions above their glass transition temperature), and next non-thermoplastic elastomers and finally thermoset resins.

According to one particular embodiment, the main reinforcing reinforcer of the adapter comprises at least one ply of radial reinforcing elements.

Alternatively, the main reinforcing reinforcer of the adapter may comprise at least two plies of reinforcing elements that are parallel to one another in each ply and crossed from one ply to the next making with the circumferential direction of the set an angle that may be comprised between 15 and 85°.

The reinforcing reinforcer may notably be anchored in the adapter bead by being wrapped around a circumferential anchoring ring so as to form a turn-up.

Alternatively, it may be anchored in the adapter bead by clamping between the circumferential reinforcing elements of a circumferential anchoring ring.

According to one particular embodiment, the mounting rim comprises a frustoconically tapered seat; the bead of the adapter comprises a reinforcing ring that has a frustoconically tapered face; and the reinforcing reinforcer of the adapter and its turn-up are clamped between the frustoconically tapered seat of the mounting rim and the frustoconically tapered face of the reinforcing ring of the bead of the adapter.

According to another particular embodiment, the housing reinforcement has a flange, and the main reinforcing reinforcer of the adapter is connected to the housing reinforcement of the adapter by bonding to a radially exterior face of the housing and axially on the inside of this flange.

According to an alternative embodiment, the housing reinforcement comprises a flange; and the main reinforcing reinforcer of the adapter is connected to the housing reinforcement of the adapter by being wrapped around the radially upper end of this flange.

According to one particular embodiment, the adapter comprises at least one additional reinforcer reinforcing the adapter bead and/or the housing of the adapter. This additional reinforcer may notably comprise at least one layer of filamentary reinforcing elements making with the circumferential direction an angle comprised between 10° and 45°.

Another aspect of the invention also relates to an adapter for (i.e. suitable for) a running set according to an embodiment of the invention.

Of course, it may be advantageous to combine several of the embodiments described above.

BRIEF DESCRIPTION OF THE DRAWINGS

All the figures in this document are schematic.

DETAILED DESCRIPTION OF THE DRAWINGS

When using the term "radial" it is appropriate to make a distinction between the various different uses made of this word by those skilled in the art. Firstly, the expression refers to a radius of the tire. It is in this sense that a point P1 is said to be "radially inside" a point P2 (or "radially on the inside of" the point P2) if it is closer to the axis of rotation of the tire than is the point P2. Conversely, a point P3 is said to be "radially outside" a point P4 (or "radially on the outside of" the point P4) if it is further away from the axis of rotation of the tire than is the point P4. Progress will be said to be "radially inwards (or outwards)" when it is in the direction towards smaller (or larger) radii. It is this sense of the term that applies also when matters of radial distance are being discussed.

By contrast, a thread or a reinforcement is said to be "radial" when the thread or the reinforcing elements of the reinforcement make an angle greater than or equal to 80° and less than or equal to 90° with the circumferential direction. Let us specify that, in this document, the term "thread" is to be understood in a very general sense and comprises threads in the form of monofilaments, multifilaments, cords, folded yarns or equivalent assemblies, irrespective of the material of which the thread is made or of the surface treatment it has received in order to encourage it to bond with the rubber.

Finally, a "radial section" or "radial cross section" here means a sectional cross section on a plane containing the axis of rotation of the tire.

An "axial" direction is the direction parallel to the axis of rotation of the tire. A point P5 is said to be "axially inside" a point P6 (or "axially on the inside of" the point P6) if it is closer to the midplane of the tire than is the point P6. Conversely, a point P7 is said to be "axially outside" a point P8 (or "axially on the outside of" the point P8) if it is further from the midplane of the tire than is the point P8. The "midplane" of the tire is the plane which is perpendicular to the axis of rotation of the tire and which lies equal distances from the annular reinforcing structures of each bead.

A "circumferential" direction is a direction which is perpendicular both to a radius of the tire and to the axial direction.

In the context of this document, the expression "rubber composition" denotes a compound of rubber containing at least one elastomer and a filler.

Figure 1:
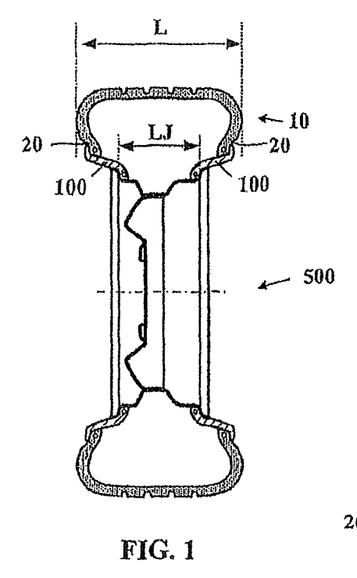
FIGS. 1 to 6 each depict, in radial section, part of a running set according to embodiments of the invention.

FIG. 1 schematically depicts a running set according to the invention. This set comprises a tire 10 comprising two beads 20, a mounting rim 500 of which the width LJ is equal to 55% of the maximum axial width L of the tire 10 inflated to its service pressure, and two adapters 100 which provide the connection between the mounting rim 500 and the two beads 20 of the tire 10.

Figure 2:
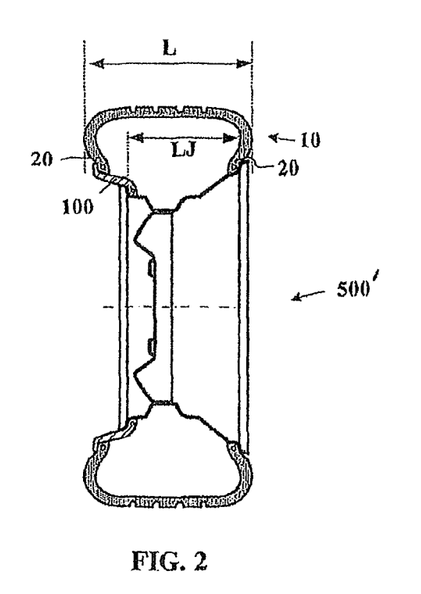

FIG. 2 depicts another running set according to the invention. Unlike the running set of FIG. 1, this running set has just one adapter 100 that provides a connection between the mounting rim 500' and a bead 20 of the tire 10. The width LJ here is equal to 70% of the maximum axial width L of the tire 10 inflated to its service pressure.

Figure 3:
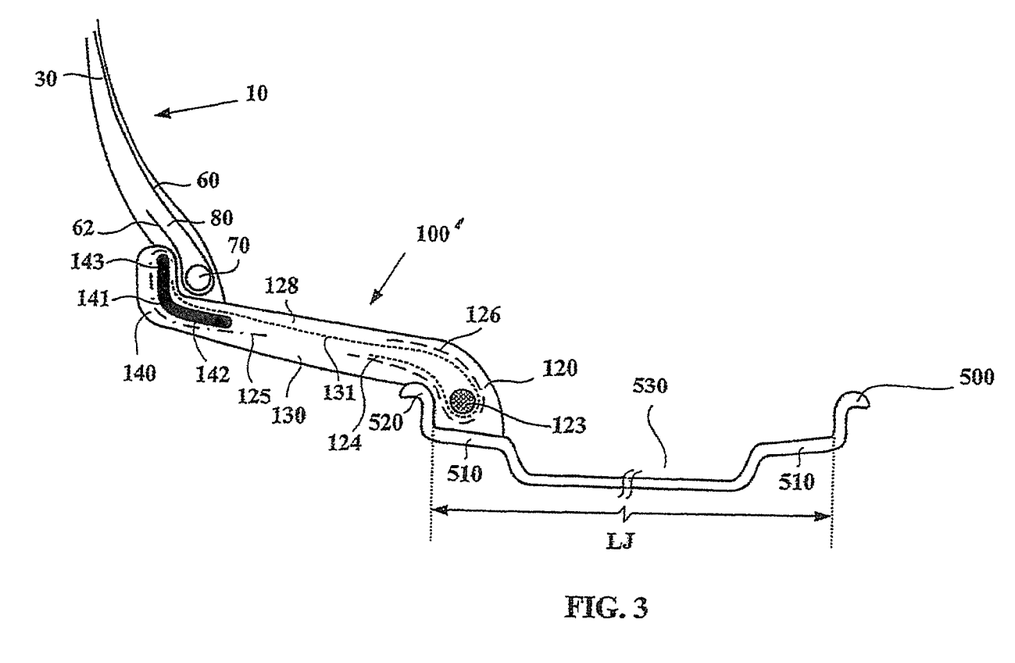

FIG. 3 shows part of a running set according to the invention. This set comprises a tire 10, an adapter 100' and a mounting rim 500. The tire 10, as known, is formed of a tread reinforced with a crown reinforcement of one or more layers of reinforcing elements (not depicted) and connected to two beads one each side of the midplane, by two sidewalls 30. A carcass reinforcement 60 chiefly reinforcing the sidewalls 30 is anchored in each bead to at least one bead wire 70, here of the "braided" type, to form turn-ups 62, separated by the main part of the carcass reinforcement 60 by a filler 80.

In the embodiment depicted in FIG. 3, the mounting rim 500 is a rim of the usual construction with a well 530 referred to as a "mounting well" and which combines, or one on each side of the equatorial plane, two rim seats 510, the frustoconical generatrices of which make an angle of 5° with the axis of rotation, the seats being, axially towards the outside, extended by rim flanges 520, the radially outer edges of which are greatly bent over. The specific feature of the rim 500 is its axial width LJ which, in the case studied here (with a tire of size 225/45 R17) is equal to 140.5 mm, i.e. is equal to 60% of the maximum axial width of the tire 10 mounted and inflated to its recommended pressure. Positioned between the rim 500 and the bead of the tire 10 is an adapter 100' made up mainly of a housing 140, connected to an adapter bead 120 by a connecting body 130. The housing reinforcement 141, of metal in the example described but which could be made of plastic or composite such as a resin reinforced with fibres of any kind, is formed of a seat 142 which is inclined, in this example and with respect to the axis of rotation of the set, by an angle of 5°, and extended axially or radially to the outside by a flange 143, the dimensions of these elements being standardized, whether this be the height of the flange 143 or the axial width of the seat 142. The walls of the housing reinforcement 141 are treated, for example brassed in the case studied of a metal reinforcement, to allow correct adhesion with the rubber compounds used in the main reinforcing reinforcer 131 and any additional reinforcements the adapter 100' might have. The main reinforcing reinforcer 131 is made up of a ply of textile cords made of aromatic polyamide, which are mutually parallel within the ply and radial, and this ply is, on the one hand, axially on the inside and radially on the outside pressed against the walls of the housing reinforcement 141 and, on the other hand, anchored in each adapter bead 120 to a circumferential anchoring ring 123, such as a bead wire, to form a turn-up 124. The main reinforcing reinforcer 131 is supplemented by additional reinforcements: arranged in the bead 120 is a first bead reinforcing ply 126, made of an aliphatic polyamide fabric formed of filamentary reinforcing elements which are mutually parallel within each layer of fabric and crossed with one another; arranged on the same side as the housing reinforcement 141 of the adapter 100' is an additional reinforcement 125 made of a fabric identical to the previous one formed of two layers of textile elements in aliphatic polyamide which are parallel to one another within each ply and crossed from one layer to the next, making with the circumferential direction an angle of 45°. This additional reinforcement 125 partially covers the axially inner wall then the upper end then the axially outer wall of the flange 143 and finally the radially inner wall of the seat 142 so that it has an edge pressed against the main reinforcing ply 131, the end of which edge is distant from the midplane by an amount that is less than the distance separating the axially inner end of the seat 142 from this plane. A layer of protective rubber compound covers, on the outside of the housing reinforcement 141, the radially inner face of the adapter 100' and provides the connection with the rim flange of the mounting rim 500 by surrounding the reinforcements 131 and 126. On its radially inner face intended to be in contact with the inflation gas of the set, the adapter 100' comprises a layer 128 of a rubber compound that is impermeable to gas.

Figure 4:
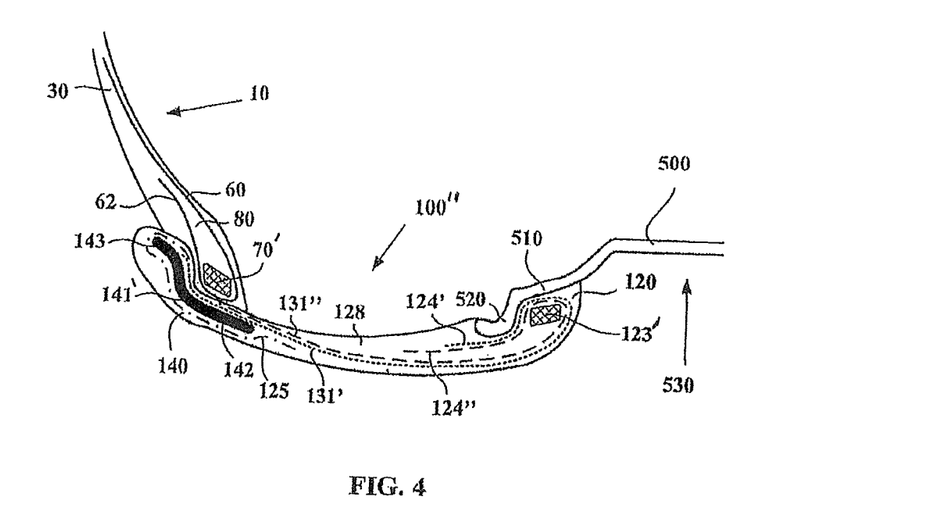

The running set of FIG. 4 differs from that of FIG. 3 by
the tire, which has beads 70', the seats of which are inclined with respect to the axis of rotation of the set by an angle equal to 20°, and which are reinforced by bead wires of the type having rectangular threads;
the mounting rim 500, which has a mounting well 530 facing toward the inside of the set, seats 510 which are inclined with respect to the axis of rotation by an angle of 15°, the seats 510 being extended axially to the outside and radially towards the inside by rim flanges 520 with bent over edges, the rim accepting the beads of the adapter via the inside;
the adapter 100", which is made up:
(a) of a housing reinforcement 141', formed of a seat 142 which is inclined with respect to the axis of rotation of the set by an angle equal to 15° and extended axially and radially to the outside by a flange 143, the other dimensions of these elements being standardized, whether this be the height of the flange 143 or the axial width of the seat 142;
(b) a main reinforcing reinforcer formed of two plies of textile cords 131' and 131" made of polyester, which are mutually parallel within each of the plies but crossed from one ply 131' to the next 131", making with the circumferential direction of the set an angle of 45°; these plies are, as before, on the one hand axially on the inside and radially on the outside pressed against the pre-treated walls of the housing reinforcement 141' of the adapter 100" and, on the other hand, anchored in each bead of the adapter 120 to a circumferential anchoring ring 123', such as a bead wire, to form turn-ups 124' and 124", the ends of which are axially offset from one another,
(c) an additional reinforcement supplementing the main reinforcing reinforcer 131: arranged on the same side as the housing reinforcement 141' of the adapter 100" is an additional reinforcement 125 formed of the same fabric as before with textile elements, this reinforcement 125 partially covering the axially inner wall then the upper end then the axially outer wall of the flange 143 and finally partially covering the radially inner wall of the seat 142 so that it has an edge pressed against the main reinforcing ply 131, the end of which edge is distant from the median plane by an amount less than the distance separating the axially inner end of the seat (142) from this plane;
(d) layers of rubber compound, firstly for protection and secondly on its radially inner face through the inner layer 128 of gas-impermeable rubber compound.

Figure 5:
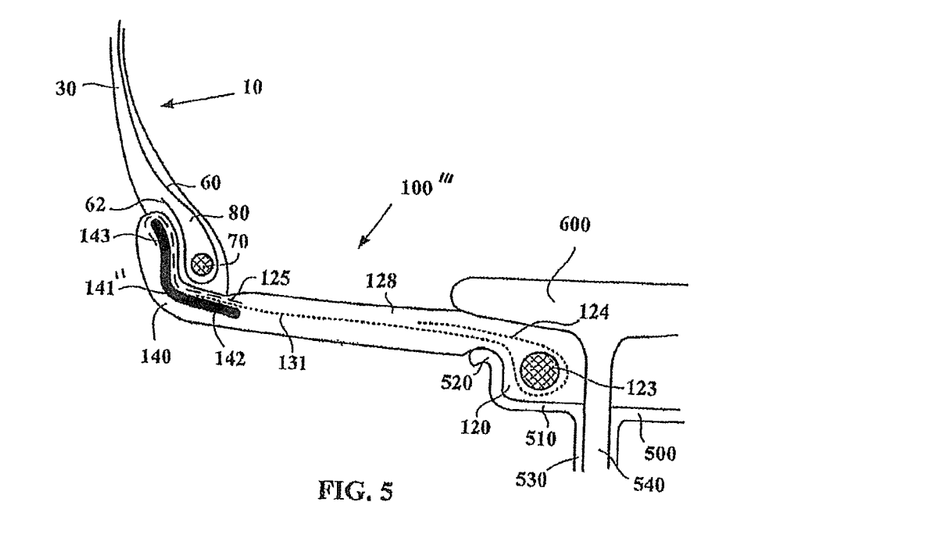

The running set of FIG. 5 differs from that of FIG. 3 through the construction of the adapter bead 120 and through the construction of the system for catching the bead on the mounting rim 500. This system is in fact made up of two elements; the actual mounting rim 500 per se and a bead clamp 600. The rim 500 is formed of two conventional flanges 520, extended radially on the inside and axially on the inside by two flat rim seats 510, themselves extended radially towards the inside by two radial annular discs 530 with a certain axial spacing between them. This space will house the radially mobile discs 540 made in at least three parts which, joined together circumferentially, form the bead clamp plate 600, the axial width of which plate is enough to be able to clamp and wedge the beads on the rim seats 510. The plate may advantageously also serve to support the tread of the tire of the set when the tire is running at low or even zero pressure. As for the construction of the adapter bead 120, it is suited in terms of its make up and shape, to the catching principle described hereinabove; in particular, it is advantageous for the main reinforcing reinforcer 131 of the adapter 100''' to be anchored by being wrapped around a rubber ring 123 that has a high compression modulus but is extensible in the circumferential direction. Moreover, arranged on the same side as the housing reinforcement 141'' of the adapter 100''' is an additional reinforcement 125 made of a fabric identical to the previous one formed of two layers of aliphatic polyamide elements, which are mutually parallel within each ply and crossed from one layer to the next, making with the circumferential direction an angle of 45°; this reinforcement 125 partially covers the axially inner wall then the upper end then partially covers the axially outer wall of the flange 143 to have an end situated at a radial distance from the axis of rotation that corresponds to the middle of the flange 143.

Figure 6:
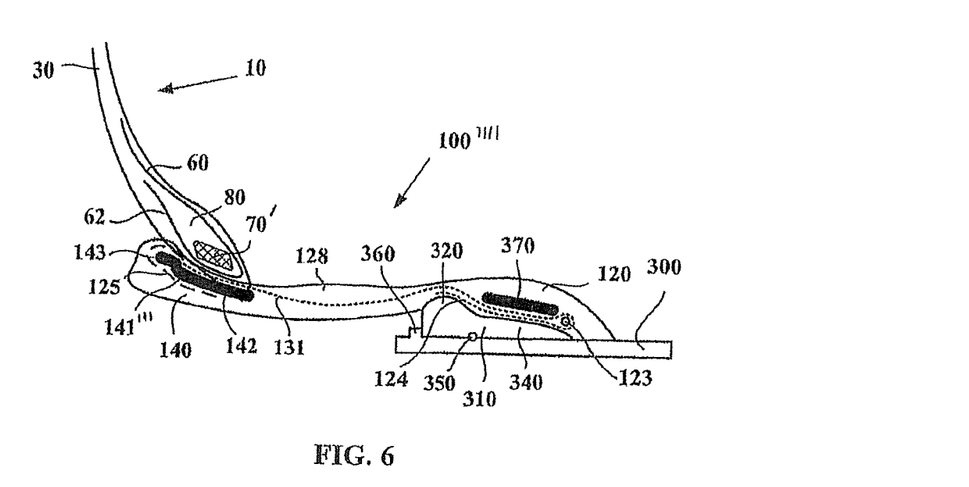

The last example of a running set according to the invention is shown in FIG. 6. The tire is identical to the one shown and used in the set of FIG. 4. The mounting rim is what is referred to as a multipart rim, at least two parts of which are mobile. Such a rim is of the same kind as the rims used for fitting certain "heavy goods" tires and "construction plant" tires. This rim is chiefly made up of a rim bottom 300, which may be flat, this rim bottom 300 being extended on just one side of the rim by a conically tapered seat itself extended by a rim flange or hoop, the seat and flange being on this side and fixed (not shown). On the axially opposite side, a single mobile part 310, formed of a flange 320 and of a conically tapered ring 340, can be slipped over the rim bottom after the adapter bead 120 has itself been brought onto the rim bottom. An O-ring seal 350, to seal the assembly, and a locking ring 360 to block the assembly on the rim bottom 300, supplements the single part 310. It is quite obvious that any adapter bead 120, of whatever type, can be mounted on such a rim. The example described relates to a preferred alternative form in which the main reinforcing reinforcer 131 of the adapter 100'''', made up of a ply of radial textile cords, and its turn-up 124, are clamped between the frustoconically tapered seat of the mobile ring 340 and a reinforcing ring 370 that has a radially inner face that is itself frustoconically tapered, the generatrix of this face making, with the axis of rotation, the same angle as that made by the generatrix of the seat of the mobile conically tapered ring of the single part 310. The turn-up 124 of the main reinforcing reinforcer 131 is obtained by being wrapped this reinforcer around a circumferential ring 123 that has a cross section of small size and a low resistance to tension, this ring 123 being used only to enhance the blocking of the carcass reinforcement between the two frustoconical surfaces of the ring 370 and of the conically tapered ring seat 340. It is possible, particularly in cases where such a rim is used, to connect the two, left and right, adapters by an element of rubber compound that is simply vulcanized and/or reinforced while remaining elastic. FIG. 6 shows a as the housing reinforcement 141'''.

Running tests were carried out to compare a running set comprising a tire according to FIG. 1 of U.S. Pat. No. 6,626,217 with a running set comprising a tire corresponding to FIG. 3 described hereinabove. In both instances, the tire was of size 225/45 R17.

The steering capability of the two was compared subjectively in tests performed on a circuit. The evaluation programme involved manoeuvres in a straight line such as slalom, lane changes or avoidance manoeuvres, at speeds of between 80 and 120 km/h. The test drivers gave their impressions without knowing the design of the running set. These tests have been able to demonstrate that the running set according to the invention steers just as well as the reference running set.

Resistance to kerbing was quantified by causing the running sets to mount a pavement 90 mm tall at an angle of 30° with respect to the direction of forward travel of the tire; kerb mounting was performed successively at different speeds until the tire lost its inflation pressure or became deformed, and for each kerb mounting, the load transmitted to the kerb was recorded.

The table below summarizes the results obtained:

TABLE I

|  | Steering capability | Resistance to kerbing |
| --- | --- | --- |
| Reference set | 100 | 100 |
| Set according to the invention | 120 | 100 |

The running set according to the invention therefore allows a very appreciable improvement in the steering of the vehicle while at the same time maintaining a very good ability to withstand kerbing.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A running set comprising:
    a tire comprising two beads;
    a mounting rim having a width that is greater than or equal to 55% and less than or equal to 80% of a maximum axial width of the tire inflated to its service pressure; and
    at least one adapter which provides a connection between the mounting rim and one of the two tire beads, said adapter comprising:
        an adapter bead via which the adapter is disposed on the mounting rim;
        a housing configured to accept the respective bead of the tire, disposed axially outside of the rim, the housing comprising a housing reinforcement so that the bead of the tire is disposed axially outside of the rim; and
        a connecting body connecting the adapter bead and the housing, the connecting body comprising a main reinforcing reinforcer.

2. The running set according to claim 1, comprising two adapters which provide a connection between the mounting rim and the two beads of the tire.

3. The running set according to claim 1, wherein the mounting rim has a mounting well facing radially inward, the mounting well extending axially outward by frustoconically tapered or flat seats, the frustoconically tapered seats extending axially outward from the mounting well and the mounting rim is extending radially inward by rim flanges with bent over edges, the rim accepting the bead of the adapter.

4. The running set according to claim 1, wherein the mounting rim comprises a flat rim bottom, the rim bottom being, on one axial side of the rim, extended by a conically tapered seat which is itself extended by a rim flange or hoop, the conically tapered seat and the rim flange being fixed on the one axial side of the rim, the rim bottom being, on the axially opposite side of the rim supplemented firstly by a mobile part that is made up of a flange and of a conically tapered ring and can be slipped over the rim bottom, and secondly by a locking ring for immobilizing the mobile part on the rim bottom, and an O-ring sealing the conically tapered ring and the rim flange.

5. The running set according to claim 1, wherein the main reinforcing reinforcer of the adapter comprises at least one ply of radial reinforcing elements.

6. The running set according to claim 1, wherein the main reinforcing reinforcer of the adapter comprises at least two plies of reinforcing elements, the respective reinforcing elements in each ply being parallel to one another in each ply and crossed from one ply to the next making, with a circumferential direction of the set, an angle between 15 and 85°.

7. The running set according to claim 1, wherein the main reinforcing reinforcer is anchored in the adapter bead by being wrapped around a circumferential anchoring ring so as to form a turn-up.

8. The running set according to claim 1, wherein the main reinforcing reinforcer is anchored in the adapter bead by clamping between circumferential reinforcing elements of a circumferential anchoring ring.

9. The running set according to claim 7, wherein the mounting rim comprises a frustoconically tapered seat;
the bead of the adapter comprises a reinforcing ring that has a frustoconically tapered face; and
the main reinforcing reinforcer of the adapter and its turn-up are clamped between the frustoconically tapered seat of the mounting rim and the frustoconically tapered face of the reinforcing ring of the adapter bead.

10. The running set according to claim 1, wherein the housing reinforcement has a flange; and
the main reinforcing reinforcer of the adapter is connected to the housing reinforcement of the adapter and to a radially exterior face of the housing.

11. The running set according to claim 1, wherein the housing reinforcement comprises a flange; and
the main reinforcing reinforcer of the adapter is connected to the housing reinforcement of the adapter by being wrapped around the radially upper end of this flange.

12. The running set according to claim 1, wherein the adapter comprises at least one additional reinforcer reinforcing the adapter bead and/or the housing of the adapter.

13. The running set according to claim 12, wherein the additional reinforcer comprises at least one layer of filamentary reinforcing elements making with the circumferential direction an angle comprised between 10° and 45°.

14. The running set according to claim 1, comprising a single adapter.

15. The running set according to claim 1, wherein the running set is resistant to kerbing.

16. The running set according to claim 1, wherein at least one adapter is deformable radially and axially.

* * * * *